(12) United States Patent
Valente

(10) Patent No.: US 7,746,929 B2
(45) Date of Patent: Jun. 29, 2010

(54) VIDEO ENCODING AND DECODING METHODS AND CORRESPONDING DEVICES

(75) Inventor: Stéphane Valente, Paris (FR)

(73) Assignee: Trident Microsystems (Far East) Ltd., Grand Cayman (KY)

( * ) Notice: Subject to any disclaimer, the term of this patent is extended or adjusted under 35 U.S.C. 154(b) by 1026 days.

(21) Appl. No.: 10/567,224

(22) PCT Filed: Jul. 14, 2004

(86) PCT No.: PCT/IB2004/002476

§ 371 (c)(1),
(2), (4) Date: Feb. 3, 2006

(87) PCT Pub. No.: WO2005/013201

PCT Pub. Date: Feb. 10, 2005

(65) Prior Publication Data

US 2006/0209963 A1 Sep. 21, 2006

(30) Foreign Application Priority Data

Aug. 5, 2003 (EP) ................................. 03300081

(51) Int. Cl.
*H04N 7/12* (2006.01)
*H04N 11/02* (2006.01)
*H04N 11/04* (2006.01)
*G06K 9/36* (2006.01)
*G06K 9/46* (2006.01)

(52) U.S. Cl. ............................ 375/240.16; 375/240.12; 375/240.18; 382/232; 382/238; 382/248

(58) Field of Classification Search . 375/240.12–240.2; 382/236–239
See application file for complete search history.

(56) References Cited

U.S. PATENT DOCUMENTS 5,699,121 A   12/1997  Zakhor et al.

(Continued)

FOREIGN PATENT DOCUMENTS

WO   WO 9715146      4/1997
WO   01/049037 A1    7/2001

OTHER PUBLICATIONS

Al-Shaykh, et al. "Video Compression Using Matching Pursuits" IEEE Trans. on Circuits and Systems for Video Techn., vol. 9, No. 1, pp. 123-143 (Feb. 1992).

Avyeung, et al. "Overlapped Block Motion Compensation", SPIE vol. 1818, Visual Communications and Image Processing, pp. 561-571 (1992).

(Continued)

*Primary Examiner*—Marsha D Banks Harold
*Assistant Examiner*—Chikaodili E Anyikire
(74) *Attorney, Agent, or Firm*—DLA Piper LLP (US)

(57) ABSTRACT

The invention relates to the field of video compression and, more specifically, to a video encoding method applied to an input sequence of frames in which each frame is subdivided into blocks of arbitrary size. This method comprises, for at least a part of the blocks of the current frame, the steps of: generating on a block basis motion-compensated frames obtained from each current original frame and a previous reconstructed frame; generating the said motion-compensated frames residual signals; using a matching pursuit algorithm for decomposing each of the generated residual signals into coded dictionary functions called atoms, the other blocks of the current frame being processed by means of other coding techniques; coding said atoms and the motion vectors determined during the motion compensation step, for generating an output coded bitstream; said method being such that any atom acts only on one block B at a time, said block-restriction leading to the fact that the reconstruction of a residual signal f is obtained from a dictionary that is composed of basis functions $g_{\gamma n\varepsilon B}$ restricted to the block B corresponding to the indexing parameter $\gamma_n$, according to the following 2D spatial domain operation: $g_{\gamma n\varepsilon B}(i,j)=g_{\gamma n}(i,j)$ if pixel $(i,j)\in B$; $g_{\gamma n\varepsilon B}(i,j)=0$ otherwise (i.e. $(i,j)\notin B$).

5 Claims, 3 Drawing Sheets

U.S. PATENT DOCUMENTS

| | | | |
|---|---|---|---|
| 6,148,106 A | | 11/2000 | Impagliazzo |
| 7,003,039 B2* | | 2/2006 | Zakhor et al. ......... 375/240.22 |
| 2003/0058943 A1* | | 3/2003 | Zakhor et al. ......... 375/240.12 |
| 2003/0103523 A1* | | 6/2003 | Frossard et al. ............ 370/465 |
| 2004/0131268 A1 | | 7/2004 | Sekiguchi et al. |
| 2004/0264792 A1* | | 12/2004 | Hwang et al. .............. 382/240 |

OTHER PUBLICATIONS

Mallat, S., et al. "Matching Pursuits With Time-Frequency Dictionaries", IEEE Trans. on Signal Processing, vol. 41, No. 12, pp. 3397-3415 (Dec. 1993).

Neff, R. et al., "Matching Pursuit Video Coding at Very Low Bit Rates", IEEE, pp. 411-420 (1995).

Gharavi-Alkhansari, M. et al. "Fractal Video Coding by Matching Pursuit", IEEE, pp. 157-160 (1996).

Banham, M. et al. "A Selective Update Approach to Matching Pursuits Video Coding" IEEE Trans. on Circuits and Systems for Video Techn., vol. 7, No. 1, pp. 119-129 (Feb. 1997).

Neff, R. "Very Low Bit-Rate Video Coding Based on Matching Pursuits," IEEE Trans. on Circuits and Systems for Video Techn., vol. 7, No. 1, pp. 158-171 (Feb. 1997).

Goodwin, "Adaptive Signal Models: Theory, Algorithm, and Audio Applications", thesis, University of California, Berkley, cover, pgs. v, vi, 1, 2, 185-221 (1997).

Ebrahimi, "MPEG4 Video Verification Model", chapter 14.3 ("Matching Pursuit Inter Texture Coding Mode"), pp. 252-259 (1997).

Kaup, A., et al. "Coding of Segmented Images Using Shape-Independent Basis Functions", IEEE Trans. on Image Processing, vol. 7, No. 7, pp. 937-947 (Jul. 1998).

Wohlberg, B. et al. "A Review of the Fractal Image Coding Literature", IEEE Trans. on Image Processing, vol. 8, No. 12, pp. 1716-1729 (Dec. 1999).

Neff, R. "New Methods for Matching Pursuit Video Compression", thesis, University of California, Berkley, cover-xvi (2000).

Moschetti, F. et al. "New Dictionary and Fast Atom Searching Method. . ." IEEE ICIP, pp. 685-688 (2002).

Chou, Y. et al. "Matching Pursuit Low-Bit Rate Video Coding With Dictionary Optimized by Shape-Gain Vector Quantizer", pp. 1-30 (undated).

Written Opinion for Int'l Patent Appln. PCT/IB2004/002476.

* cited by examiner

VIDEO ENCODING AND DECODING METHODS AND CORRESPONDING DEVICES

FIELD OF THE INVENTION

The present invention generally relates to the field of video compression and, for instance, more particularly to the video standards of the MPEG family (MPEG-1, MPEG-2, MPEG-4) and to the video coding recommendations of the ITU H26X family (H.261, H.263 and extensions). More specifically, the invention relates to a video encoding method applied to an input sequence of frames in which each frame is subdivided into blocks of arbitrary size, said method comprising for at least a part of said blocks of the current frame the steps of:

- generating on a block basis motion-compensated frames, each one being obtained from each current original frame and a previous reconstructed frame;
- generating from said motion-compensated frames residual signals;
- using a so-called matching pursuit (MP) algorithm for decomposing each of said generated residual signals into coded dictionary functions called atoms, the other blocks of the current frame being processed by means of other coding techniques;
- coding said atoms and the motion vectors determined during the motion compensation step, for generating an output coded bitstream.

The invention also relates to a corresponding video decoding method and to the encoding and decoding devices for carrying out said encoding and decoding methods.

BACKGROUND OF THE INVENTION

In the current video standards (up to the video coding MPEG-4 standard and H.264 recommendation), the video, described in terms of one luminance channel and two chrominance ones, can be compressed thanks to two coding modes applied to each channel: the "intra" mode, exploiting in a given channel the spatial redundancy of the pixels (picture elements) within each image, and the "inter" mode, exploiting the temporal redundancy between separate images (or frames). The inter mode, relying on a motion compensation operation, allows to describe an image from one (or more) previously decoded image(s) by encoding the motion of the pixels from one (or more) image(s) to another one. Usually, the current image to be coded is partitioned into independent blocks (for instance, of size 8×8 or 16×16 pixels in MPEG-4, or of size 4×4, 4×8, 8×4, 8×8, 8×16, 16×8 and 16×16 in H.264), each of them being assigned a motion vector (the three channels share such a motion description). A prediction of said image can then be constructed by displacing pixel blocks from a reference image according to the set of motion vectors associated to each block. Finally, the difference, or residual signal, between the current image to be encoded and its motion-compensated prediction can be encoded in the intra mode (with 8×8 discrete cosine transforms—or DCTs—for MPEG-4, or 4×4 DCTs for H.264 in the main level profile).

The DCT is probably the most widely used transform, because it offers a good compression efficiency in a wide variety of coding situations, especially at medium and high bitrates. However, at low bitrates, the hybrid motion compensated DCT structure may be not able to deliver an artefact-free sequence for two reasons. First, the structure of the motion-compensated inter prediction grid becomes visible, with blocking artifacts. Moreover, the block edges of the DCT basis functions become visible in the image grid, because too few coefficients are quantized—and too coarsely—to make up for these blocking artifacts and to reconstruct smooth objects in the image.

The document "Very low bit-rate video coding based on matching pursuits", R. Neff and A. Zakhor, IEEE Transactions on Circuits and Systems for Video Technology, vol. 7, no. 1, February 1997, pp. 158-171, describes a new motion-compensated system including a video compression algorithm based on the so-called matching pursuit (MP) algorithm, a technique developed about ten years ago (see the document "Matching pursuits with time-frequency dictionaries", S. G. Mallat and Z. Zhang, IEEE Transactions on Signal Processing, vol. 41, no. 12, December 1993, pp. 3397-3414). Said technique provides a way to iteratively decompose any function or signal (for example, image, video, . . . ) into a linear expansion of waveforms belonging to a redundant dictionary of basis functions, well localized both in time and frequency and called atoms. A general family of time-frequency atoms can be created by scaling, translating and modulating a single function $g(t) \epsilon L^2(R)$ supposed to be real and continuously differentiable. These dictionary functions may be designated by:

$$g_\gamma(t) \epsilon G (G=\text{dictionary set}), \qquad (1)$$

$\gamma$(=gamma) being an indexing parameter associated to each particular dictionary element (or atom). As described in the first cited document, assuming that the functions $g_\gamma(t)$ have unit norm, i.e. $<g_\gamma(t), g_\gamma(t)>=1$, the decomposition of a one-dimensional time signal $f(t)$ begins by choosing $\gamma$ to maximize the absolute value of the following inner product:

$$p=<f(t), g_\gamma(t)>, \qquad (2)$$

where p is called an expansion coefficient for the signal $f(t)$ onto the dictionary function $g_\gamma(t)$. A residual signal R is then computed:

$$R(t)=f(t)-p \cdot g_\gamma(t) \qquad (3)$$

and this residual signal is expanded in the same way as the original signal $f(t)$. An atom is, in fact, the name given to each pair $\gamma_k, p_k$, where k is the rank of the iteration in the matching pursuit procedure. After a total of M stages of this iterative procedure (where each stage n yields a dictionary structure specified by $\gamma_n$, an expansion coefficient $p_n$ and a residual $R_n$ which is passed on to the next stage), the original signal $f(t)$ can be approximated by a signal $\tilde{f}(t)$ which is a linear combination of the dictionary elements thus obtained. The iterative procedure is stopped when a predefined condition is met, for example either a set number of expansion coefficients is generated or some energy threshold for the residual is reached.

In the first document mentioned above, describing a system based on said MP algorithm and which performs better than the DCT ones at low bitrates, original images are first motion-compensated, using a tool called overlapped block-motion compensation which avoids or reduces blocking artifacts by blending the boundaries of predicted/displaced blocks (the edges of the blocks are therefore smoothed and the block grid is less visible). After the motion prediction image is formed, it is subtracted from the original one, in order to produce the motion residual. Said residual is then coded, using the MP algorithm extended to the discrete two-dimensional (2D) domain, with a proper choice of a basis dictionary (said dictionary consists of an overcomplete collection of 2D separable Gabor functions g, shown in FIG. 1).

A residual signal f is then reconstructed by means of a linear combination of M dictionary elements:

$$\hat{f} = \sum_{n=1}^{n=M} \hat{p}_n \cdot g_{\gamma_n} \quad (4)$$

If the dictionary basis functions have unit norm, $\hat{p}_n$ is the quantized inner product $<,>$ between the basis function $g_{\gamma_n}$ and the residual updated iteratively, that is to say:

$$p_n = <f - \sum_{k=1}^{k=n-1} \hat{p}_k \cdot g_{\gamma_k}, g_{\gamma_n}> \quad (5)$$

the pairs ($\hat{p}_n, \gamma_n$) being the atoms. In the work described by the authors of the document, no restriction is placed on the possible location of an atom in an image (see FIG. 2). The 2D Gabor functions forming the dictionary set are defined in terms of a prototype Gaussian window:

$$w(t) = \{\text{fourth root}\}\sqrt{2} \cdot e^{-\pi t^2} \quad (6)$$

A mono-dimensional (1D) discrete Gabor function is defined as a scaled, modulated Gaussian window:

$$g_{\vec{\alpha}}(i) = K_{\vec{\alpha}} \cdot w\left(\frac{i - \frac{N}{2} + 1}{s}\right) \cdot \cos\left(\frac{2\pi\xi\left(i - \frac{N}{2} + 1\right)}{N} + \phi\right) \quad (7)$$

with: $i \in \{0, 1, \ldots, N-1\}$.

The constant $K_{\vec{\alpha}}$ is chosen so that $g_{\vec{\alpha}}(i)$ is of unit norm, and $\vec{\alpha} = (s, \xi, \phi)$ is a triple consisting, respectively, of a positive scale, a modulation frequency, and a phase shift. If S is the set of all such triples $\vec{\alpha}$, then the 2D separable Gabor functions of the dictionary have the following form:

$$G_{\vec{\alpha},\vec{\beta}}(i,j) = g_{\vec{\alpha}}(i)g_{\vec{\beta}}(j) \text{ for } i,j \in \{0,1,\ldots,N-1\}, \text{ and } \vec{\alpha}, \vec{\beta} \in S \quad (8)$$

The set of available dictionary triples and associate sizes (in pixels) indicated in the document as forming the 1D basis set (or dictionary) is shown in the following table 1:

TABLE 1

| k | $s_k$ | $\zeta_k$ | $\phi_k$ | size (pixels) |
|---|---|---|---|---|
| 0 | 1.0 | 0.0 | 0 | 1 |
| 1 | 3.0 | 0.0 | 0 | 5 |
| 2 | 5.0 | 0.0 | 0 | 9 |
| 3 | 7.0 | 0.0 | 0 | 11 |
| 4 | 9.0 | 0.0 | 0 | 15 |
| 5 | 12.0 | 0.0 | 0 | 21 |
| 6 | 14.0 | 0.0 | 0 | 23 |
| 7 | 17.0 | 0.0 | 0 | 29 |
| 8 | 20.0 | 0.0 | 0 | 35 |
| 9 | 1.4 | 1.0 | $\pi/2$ | 3 |
| 10 | 5.0 | 1.0 | $\pi/2$ | 9 |
| 11 | 12.0 | 1.0 | $\pi/2$ | 21 |
| 12 | 16.0 | 1.0 | $\pi/2$ | 27 |
| 13 | 20.0 | 1.0 | $\pi/2$ | 35 |
| 14 | 4.0 | 2.0 | 0 | 7 |

TABLE 1-continued

| k | $s_k$ | $\zeta_k$ | $\phi_k$ | size (pixels) |
|---|---|---|---|---|
| 15 | 4.0 | 3.0 | 0 | 7 |
| 16 | 8.0 | 3.0 | 0 | 13 |
| 17 | 4.0 | 4.0 | 0 | 7 |
| 18 | 4.0 | 2.0 | $\pi/4$ | 7 |
| 19 | 4.0 | 4.0 | $\pi/4$ | 7 |

To obtain this parameter set, a training set of motion residual images was decomposed using a dictionary derived from a much larger set of parameter triples. The dictionary elements which were most often matched to the training images were retained in the reduced set. The obtained dictionary was specifically designed so that atoms can freely match the structure of motion residual image when their influence is not confined to the boundaries of the block they lie in (see FIG. 2, showing the example of an atom placed in a block-divided image without block-restrictions).

However, the approach described in the cited document suffers from several limitations. The first one is related to the continuous structure of the Gabor dictionary. Because atoms can be placed at all pixel locations without any restriction and therefore span several motion-compensated blocks, the MP algorithm cannot represent blocking artefacts in the residual signal with a limited number of smooth atoms. It is the reason why it is necessary to have some kind of overlapped motion estimation, in order to limit the blocking artifacts. If a classical block-based motion compensation (i.e. without overlapping windows) is used, the smooth basis functions may not be appropriate to make up for blocking artifacts (indeed, it has been recently showed that coding gains could be made when the size of the residual coding transform is matched to the size of the motion-compensated block). Third, it is difficult to combine intra and inter blocks in a coded frame (in the cited document, no DCT intra macroblock exists, probably in order to avoid discontinuities on the boundaries of blocks coded in intra and inter mode that would be badly modelled by the smooth structure of Gabor basis functions).

SUMMARY OF THE INVENTION

It is therefore an object of the invention to propose a video encoding method in which these limitations no longer exist.

To this end, the invention relates to a video encoding method such as defined in the introductory part of the description and which is moreover such that, when using said MP algorithm, any atom acts only on one block B at a time, said block-restriction leading to the fact that the reconstruction of a residual signal f is obtained from a dictionary that is composed of basis functions $g_{\gamma_n}|_B$ restricted to the block B corresponding to the indexing parameter $\gamma_n$, according to the following 2D spatial domain operation:

$$g_{\gamma_n}|_B(i,j) = g_{\gamma_n}(i,j) \text{ if pixel } (i,j) \in B$$

$$g_{\gamma_n}|_B(i,j) = 0 \text{ otherwise (i.e. } (i,j) \notin B).$$

The main interest of this approach resides in the fact that the MP atoms are restricted to the motion-compensated blocks. It allows to better model the blocky structure of residual signals, implicitly augments the dictionary diversity for the same coding cost and offers the possibility of alternating MP and DCT transforms since there is no interference across block boundaries. It also avoids the need to resort to overlapped motion compensation to limit blocking artefacts.

It is another object of the invention to propose a video encoding device allowing to carry out said encoding method.

It is still an object of the invention to propose video decoding method and device allowing to decode signals coded by means of said video encoding method and device.

BRIEF DESCRIPTION OF THE DRAWINGS

The present invention will now be described, by way of example, with reference to the accompanying drawing in which.

DETAILED DESCRIPTION OF THE INVENTION

Figure 3:
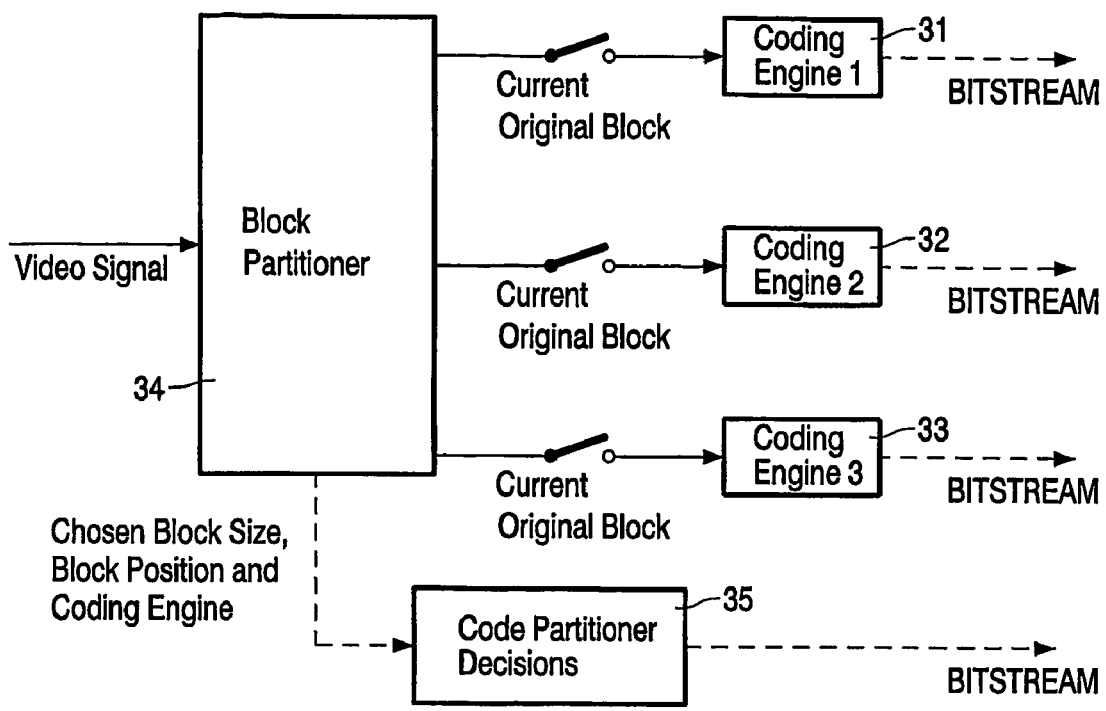
FIG. 3 illustrates an example of hybrid video coder according to the invention.

A simplified block diagram of a video encoding device implementing a hybrid video coder using multiple coding engines is shown in FIG. 3. Several coding engines implement predetermined coding techniques, for instance a coding engine 31 can implement the INTRA-DCT coding method, a second one 32 the INTER-DCT coding method, and a third one 33 the matching pursuit algorithm. Each frame of the input video sequence is received ("video signal") by a block partitioner device 34, which partitions the image into individual blocks of varying size, and decides which coding engine will process the current original block. The decisions representing the block position, its size and the selected coding engine is then inserted into the bitstream by a coding device 35. The current original signal block is then transferred to the selected coding engine (the engine 33 in the situation illustrated in FIG. 3).

Figure 4:
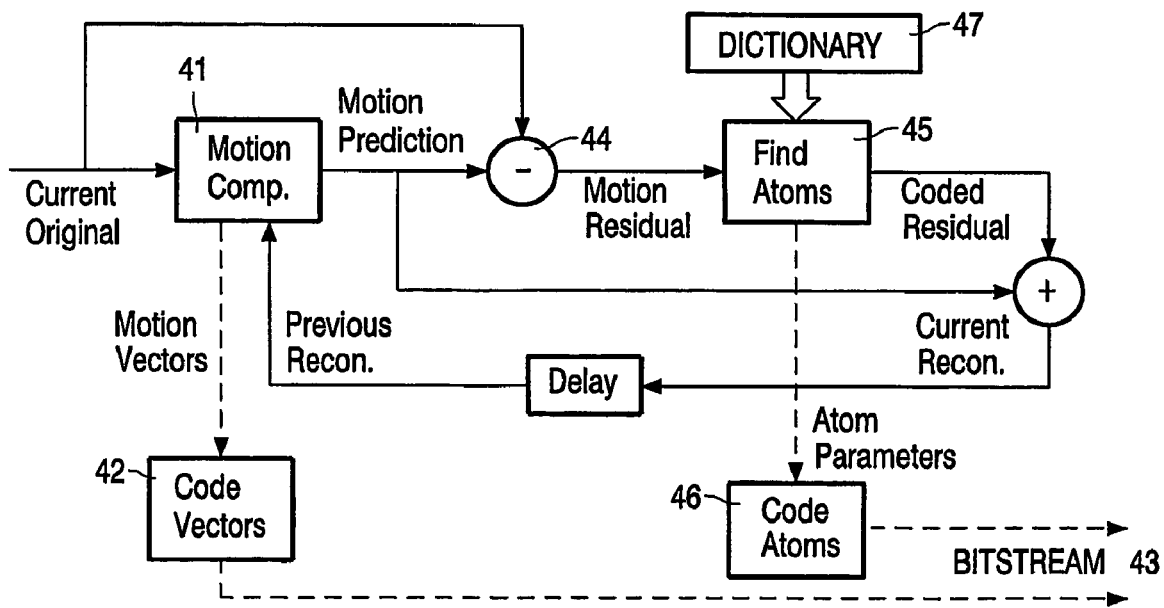
FIG. 4 shows an example of a video encoding device for implementing a MP pursuit algorithm.

A matching pursuit coding engine will be further illustrated as a simplified block diagram in FIG. 4 showing an example of a video encoding device for implementing an MP pursuit algorithm. Each of the original signal blocks of the input video sequence assigned to the coding engine 33 is received on one side by motion compensating means 41 for determining motion vectors (said motion vectors are conventionally found using the block matching algorithm), and the vectors thus obtained are coded by motion vector coding means 42, the coded vectors being delivered to a multiplexer 43 (referenced, but not shown). On the other side, a subtracter 44 delivers on its output the residual signal between the current image and its prediction. Said residual signal is then decomposed into atoms (the dictionary of atoms is referenced 47) and the atom parameters thus determined (module 45) are coded (module 46). The coded motion vectors and atom parameters then form a bitstream that is sent to match a predefined condition for each frame of the sequence.

This encoding engine 33 carries out a method of coding an input bitstream that comprises the following steps. First, as in most coding structures, the original frames of the input sequence are motion-compensated (each one is motion-compensated on the basis of the previous reconstructed frame, and the motion vectors determined during said motion-compensated step are stored in view of their later transmission). Residual signals are then generated by difference between the current frame and the associated motion-compensated prediction. Each of said residual signals is then compared with a dictionary of functions consisting of a collection of 2D separable Gabor functions, in order to generate a dictionary structure $g_\gamma(t)$ specified by the indexing parameter $\gamma_n$, an expansion coefficient p(n) and a residual $R_n(t)-p.g_\gamma(t)$ which is passed on to the next stage of this iterative procedure. Once the atom parameters are found, they can be coded (together with the motion vectors previously determined), the coded signals thus obtained forming the bitstream sent to the decoder.

Figure 1:
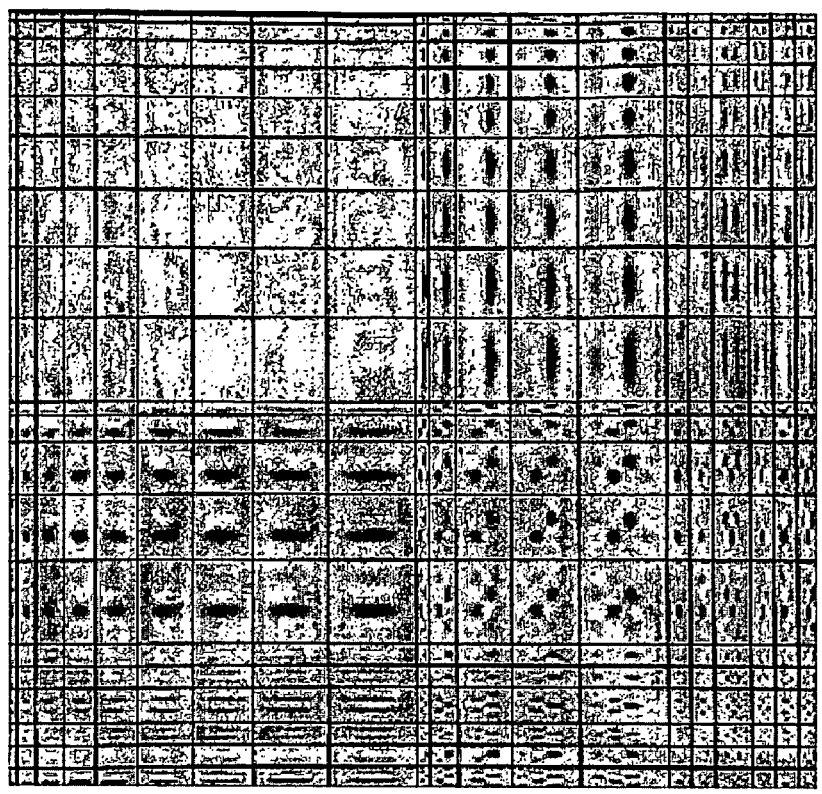
FIG. 1 allows a visualization of the 400 basis functions of the 2D Gabor dictionary used in the implementation of the matching pursuit algorithm.
Figure 2:
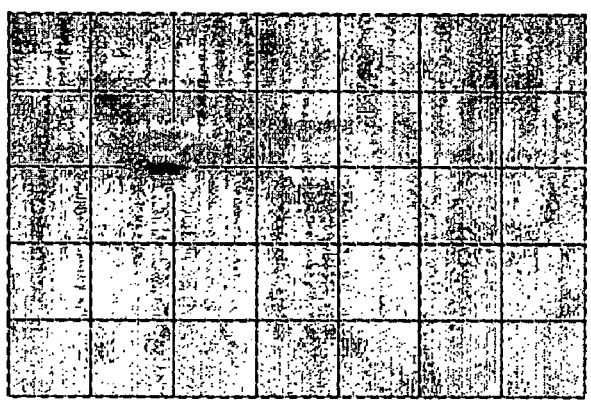
FIG. 2 illustrates the example of an atom placed in a block-divided image without block-restrictions.
Figure 5:
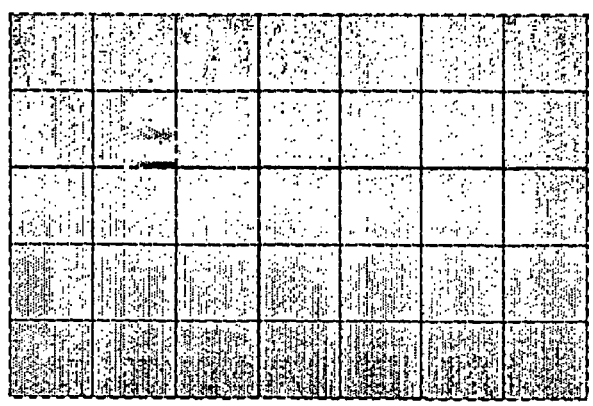
FIG. 5 illustrates the case of a block-restricted matching pursuit residual coding, with an atom being confined into the motion-compensated grid and acting only on a block at a time.

The technical solution proposed according to the invention consists in confining the influence of atoms to the boundaries of the block they lie in. This block-restriction means that an atom acts only on one block at a time, confined into the motion-compensation grid, as illustrated in FIG. 5. This block-restriction modifies the signal matching pursuit algorithm in the following manner.

If one assume that it is wanted to obtain the MP decomposition of the 2D residual in a block B of size M×N pixels after motion-compensation, and if one denotes $G|_B$ the MP dictionary restricted to B, the elements $g_{\gamma_n}|_B$ of said dictionary are obtained by means of the relationships (9) and (10):

$$g_{\gamma_n}|_B(i,j) = g_{\gamma_n}(i,j) \text{ if pixel } (i,j) \in B \quad (9)$$

$$g_{\gamma_n}|_B(i,j) = 0 \text{ otherwise (i.e. } (i,j) \notin B) \quad (10)$$

In this case, since $g_{\gamma_n}|_B$ does not necessarily have a unit norm, $p_n$ needs to be reweighted as:

$$p_n = \frac{\left\langle f - \sum_{k=1}^{k=n-1} \hat{p}_k \cdot g_{\gamma_k}|_B, g_{\gamma_n}|_B \right\rangle}{\sqrt{\langle g_{\gamma_n}|_B, g_{\gamma_n}|_B \rangle}}$$

The interest of this approach resides in the fact that because a single atom cannot span several blocks, it does not have to deal with the high-frequency discontinuities at block edges. Instead, it can be adapted to block boundaries, and even to block sizes, by designing block-size dependent dictionaries. Moreover, since overlapped motion compensation is no longer mandatory to preserve the MP efficiency, classical motion compensation may be used.

Figure 6:
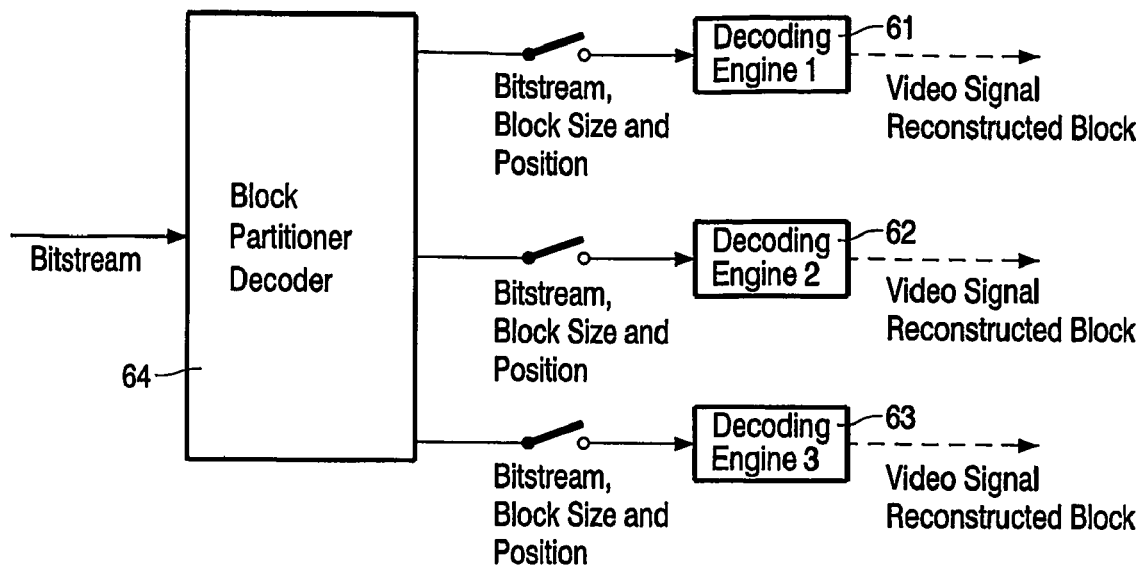
FIG. 6 illustrates an example of hybrid video decoder according to the invention.

The preferred embodiment of encoding device described above sends a bitstream which is received by a corresponding decoding device. A simplified block diagram of a video decoding device according to the invention and implementing a hybrid video decoder using multiple decoding engines is shown in FIG. 6. The transmitted bitstream is received on one side by a block partition decoding device 64, which decodes the current block position, its size, and the decoding method. Given the decoding method, the bitstream elements are then transferred to the corresponding decoding engine, 61 or 62 or 63 in the case of FIG. 6, which will in turn decode the assigned blocks and output the video signal reconstructed block. The available decoding engines can be for instance an INTRA-DCT block decoder 61, an INTER-DCT block decoder 62, and a matching pursuit block decoder 63.

Figure 7:
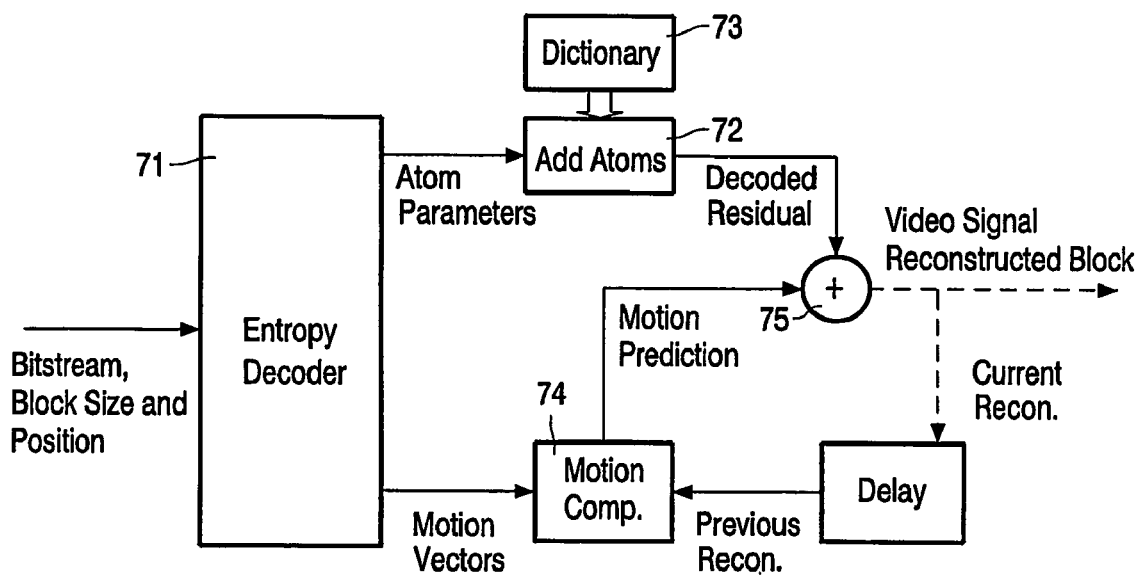
FIG. 7 shows an example of a video decoding device implementing the MP algorithm.

An example of matching pursuit decoding engine is further illustrated in FIG. 7 showing an example of a video decoding device implementing the MP algorithm. The bitstream elements are received by an entropy decoder device 71, which forwards the decoded atom parameters to an atom device 72 (the dictionary of atoms is referenced 73) which reconstructs the matching pursuit functions at the decoded position within the assigned video block to form the decoded residual signal. The entropy decoder device also output motion vectors which are fed into a motion compensation device 74 to form a motion prediction signal from previously reconstructed video signals. The motion prediction and the reconstructed residual signal are then summed in an adder 75 to produce a video signal reconstructed block.

The invention claimed is:

1. A video encoding method applied to an input sequence of frames in which each frame is subdivided into blocks of arbitrary size, said method comprising for at least a part of said blocks of the current frame the steps of:
   generating on a block basis motion-compensated frames, each one being obtained from each current original frame and a previous reconstructed frame;
   generating from said motion-compensated frames residual signals;
   using a so-called matching pursuit (MP) algorithm for decomposing each of said generated residual signals into coded dictionary functions called atoms, the other blocks of the current frame being processed by means of other coding techniques;
   coding said atoms and the motion vectors determined during the motion compensation step, for generating an output coded bitstream;
said method being such that, when using said MP algorithm, any atom acts only on one block B at a time, said block-restriction leading to the fact that the reconstruction of a residual signal f is obtained from a dictionary that is composed of basis functions $g_{\gamma_n}|_B$ restricted to the block B corresponding to the indexing parameter $\gamma_n$, according to the following 2D spatial domain operation:

$g_{\gamma_n}|_B(i,j) = g_{\gamma_n}(i,j)$ if pixel $(i,j) \in B$ $g_{\gamma_n}|_B(i,j) = 0$ otherwise (i.e. $(i,j) \notin B$).

2. A video encoding device applied to an input sequence of frames in which each frame is subdivided into blocks of arbitrary size, said device being applied to at least a part of said blocks of the current frame and comprising:
   means for generating on a block basis, by means of a motion compensation step, motion-compensated frames, each one being obtained from each current original frame and a previous reconstructed frame;
   means for generating from said motion-compensated frames residual signals;
   means for performing a so-called matching pursuit (MP) algorithm for decomposing each of said generated residual signals into coded dictionary functions called atoms, the other blocks of the current frame being processed by means of other coding techniques;
   means for coding, for each concerned block, said atoms and the motion vectors determined during the motion compensation step, for generating an output coded bitstream;
said device being such that, when using said MP algorithm, any atom acts only on one block B at a time, said block-restriction leading to the fact that the reconstruction of a residual signal f is obtained from a dictionary that is composed of basis functions $g_{\gamma_n}|_B$ restricted to the block B corresponding to the indexing parameter $\gamma_n$, according to the following 2D spatial domain operation:

$g_{\gamma_n}|_B(i,j) = g_{\gamma_n}(i,j)$ if pixel $(i,j) \in B$ $g_{\gamma_n}|_B(i,j) = 0$ otherwise (i.e. $(i,j) \notin B$).

3. A video encoding device according to claim 2, characterized in that the quantized inner product $p_n$ of a dictionary element is reweighted as:

$$p_n = \frac{\left\langle f - \sum_{k=1}^{k=n-1} \hat{p}_k \cdot g_{\gamma_k}|_B, g_{\gamma_n}|_B \right\rangle}{\sqrt{\langle g_{\gamma_n}|_B, g_{\gamma_n}|_B \rangle}}.$$

4. A video decoding method applied to a bitstream coded by means of a video coding method according to claim 1, said decoding method, comprising, for the concerned blocks, the steps of:
   decoding the coded atom parameters and motion vectors contained in said code bitstream;
   reconstructing from said decoded atom parameters the residual signals;
   generating motion compensated signals from said decoded motion vectors;
   generating video signal reconstructed blocks by summation of said residual signals and said motion compensated signals.

5. A video decoding device applied to a bitstream coded by means of a video encoding device according to claim 2, said decoding device being applied to the concerned blocks and comprising:
   means for decoding the coded atom parameters and motion vectors contained in said coded bitstream;
   means for reconstructing from said decoded atom parameters the residual signals;
   means for generating motion compensated signals from said decoded motion vectors;
   means for generating video signal reconstructed blocks by summation of said residual signals and said motion compensated signals.

* * * * *